May 13, 1941. A. MOHR, JR., ET AL 2,241,674
GAS WASHING APPARATUS
Filed Nov. 1, 1939 4 Sheets-Sheet 1

Inventors
Albert Mohr Jr
John P. Grille
By

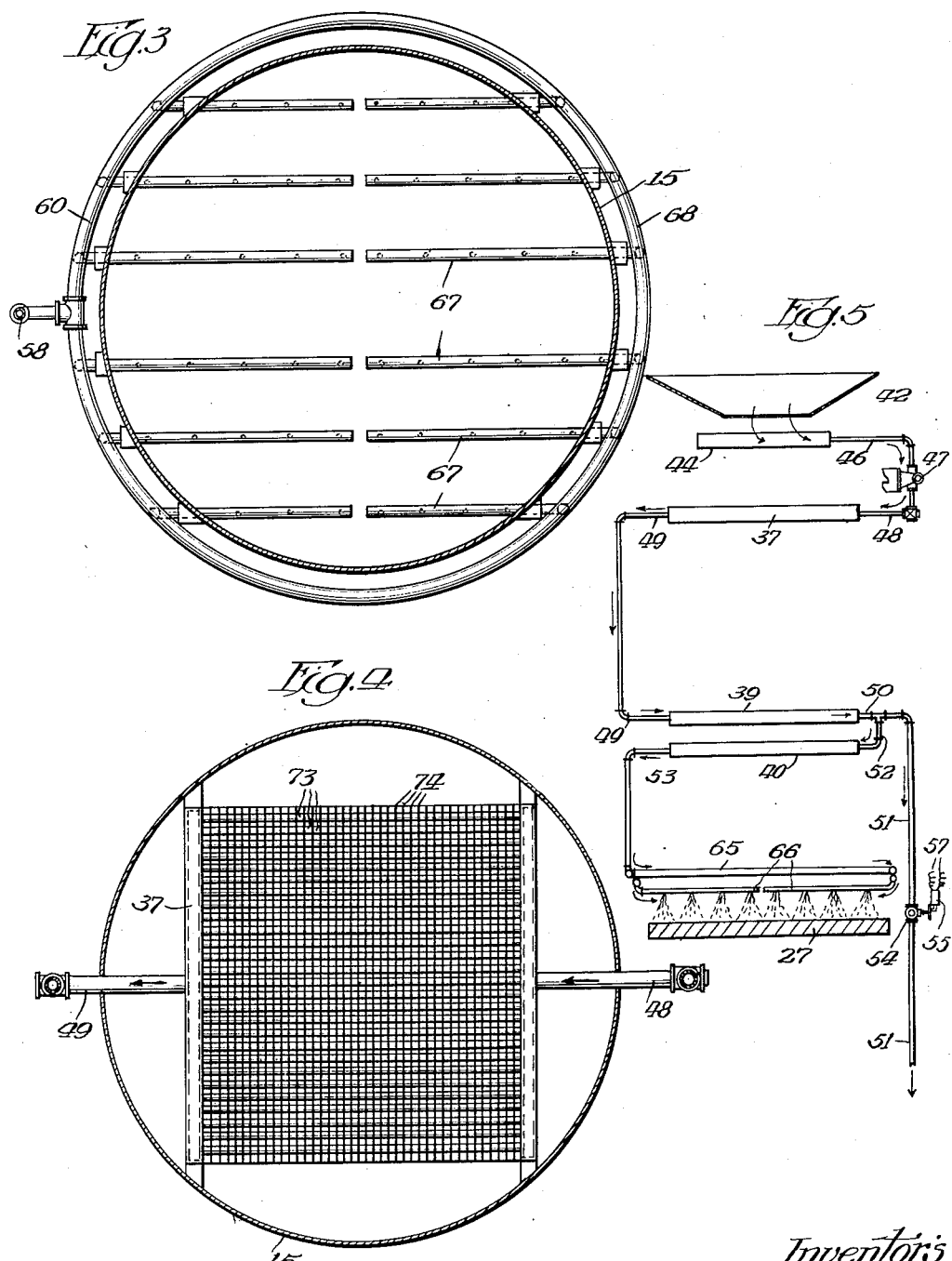

May 13, 1941.  A. MOHR, JR., ET AL  2,241,674
GAS WASHING APPARATUS
Filed Nov. 1, 1939  4 Sheets-Sheet 4
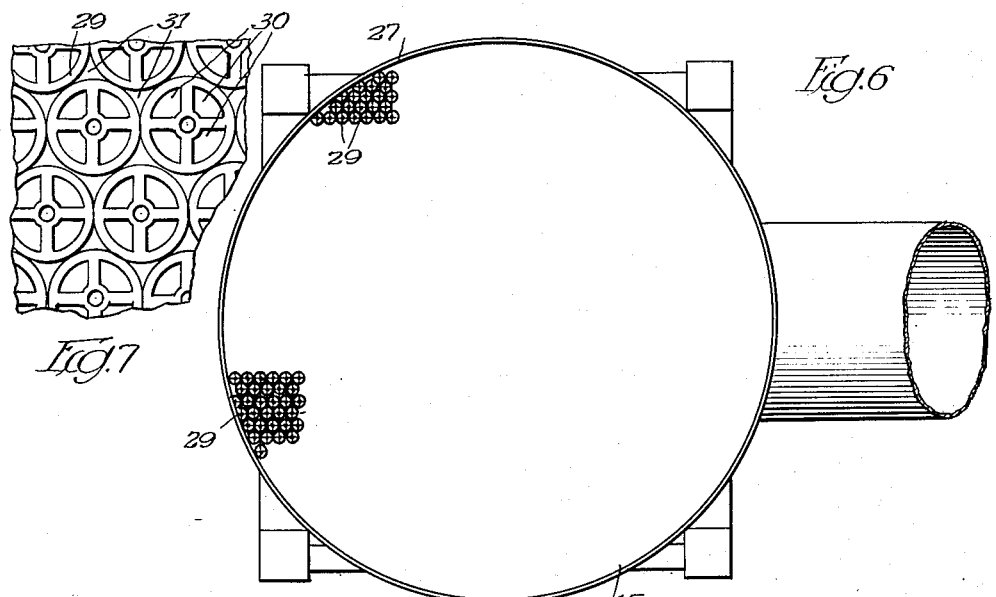
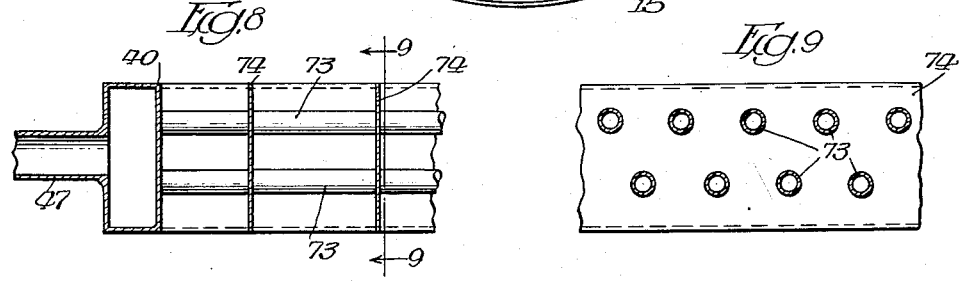
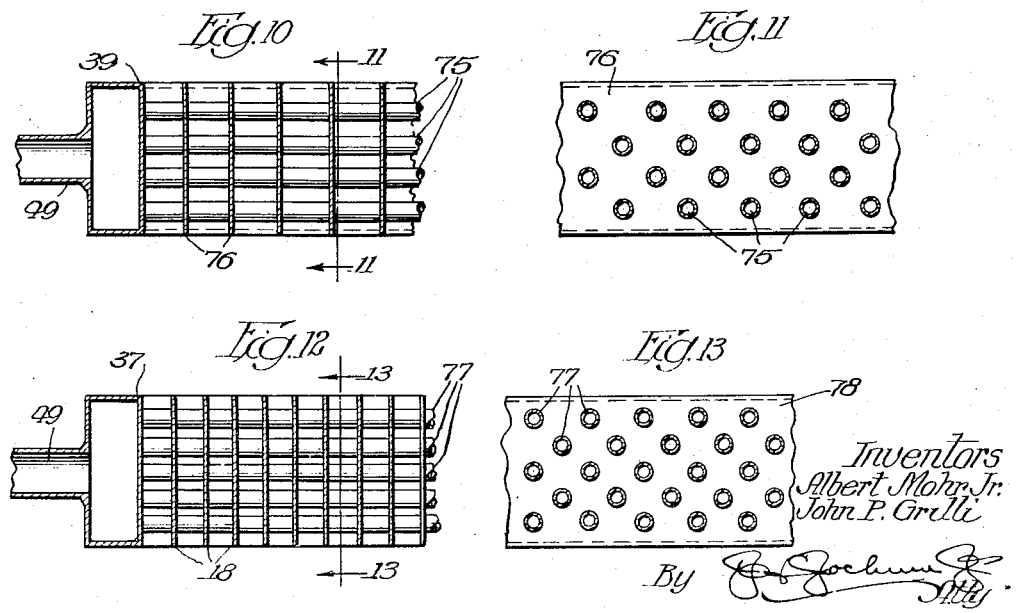
Inventors
Albert Mohr Jr.
John P. Grilli
By Patented May 13, 1941

2,241,674

UNITED STATES PATENT OFFICE 2,241,674

GAS WASHING APPARATUS

Albert Mohr, Jr., and John P. Grilli, Chicago, Ill.

Application November 1, 1939, Serial No. 302,290

1 Claim. (Cl. 261—39)

This invention relates to apparatus for the separation of suspended solids and condensible vapors from hot gases, and one of the objects is to effect a high degree of cleansing by the use of a heated washing medium in the hot washing stage. This washing medium is heated by the sensible heat and latent heat extracted from the gases leaving the hot stage.

A further object is to provide in an apparatus of this character improved means whereby the highest possible washing temperature will be provided where the gas leaves the hot stage, thereby resulting in the greatest amount of water vapor per cubic foot of gas, the condensation of which water vapor will result in the removal of the dust particles from the gas.

To the attainment of these ends and the accomplishment of other new and useful objects as will appear, the invention will be described in connection with the accompanying drawings, in which—

Figure 3 is a horizontal detail sectional view taken on line 3—3, Figure 1.

Figure 4 is a horizontal detail sectional view taken on line 4—4, Figure 1.

Figure 5 is a detail diagrammatic view showing the method of connecting the water preheaters.

Figure 6 is a detail sectional view on an enlarged scale, and with parts omitted, as taken on line 6—6, Figure 2.

Figure 7 is an enlarged detail plan view of a portion of the hurdles or surfaces contacted by the liquid and gases.

Figure 8 is a detail sectional view of a portion of one of the condensers.

Figure 9 is a sectional view taken on line 9—9 Figure 8.

Figure 10 is a view similar to Figure 8 of a portion of another one of the condensers.

Figure 11 is a sectional view taken on line 11—11 Figure 10.

Figure 12 is a detail sectional view of a portion of another one of the condensers.

Figure 13 is a sectional view taken on line 13—13, Figure 12.

Figure 1:
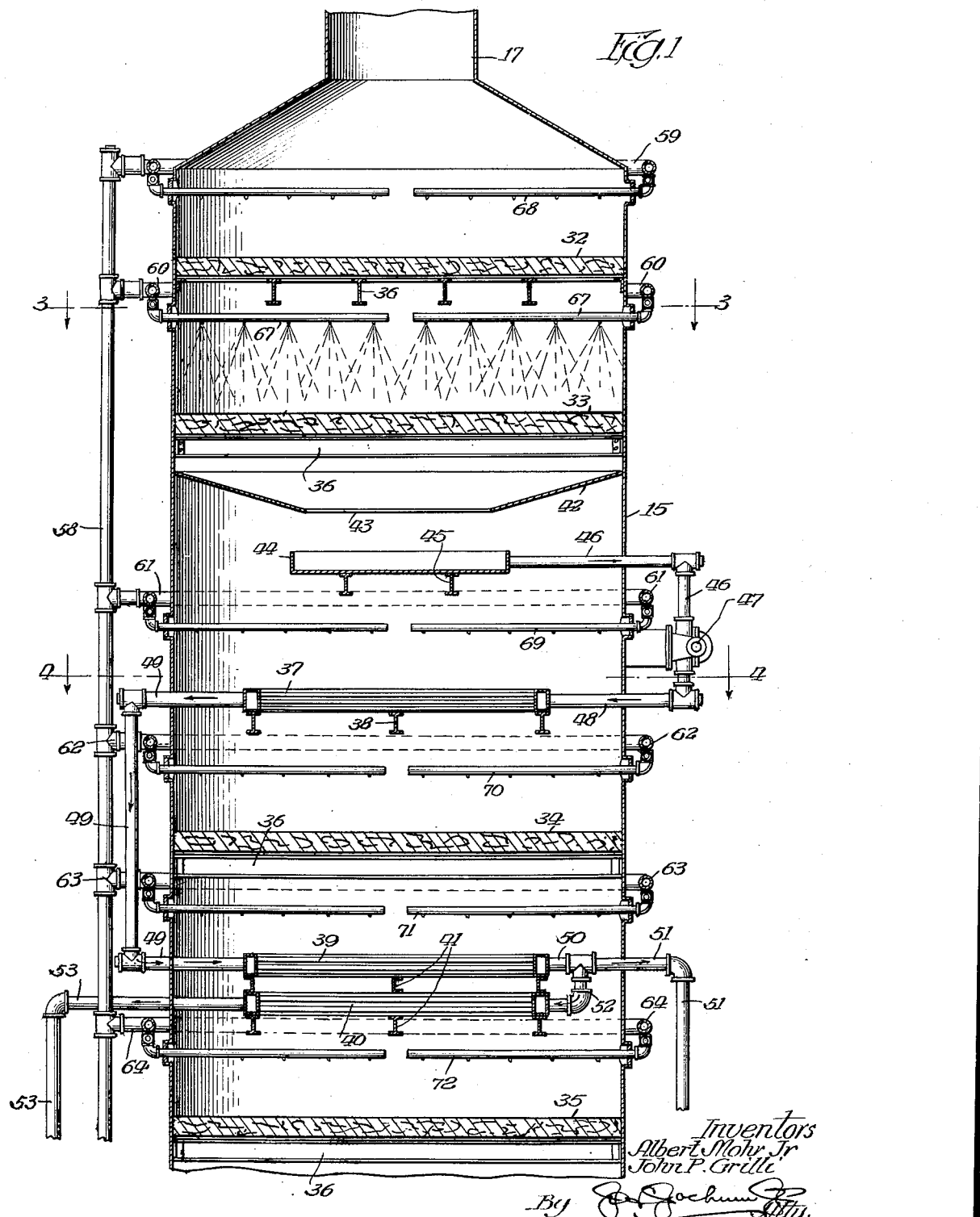
Figure 1 is a view partly in vertical section, partly in elevation, and partly in diagram of the upper part of an apparatus by means of which this improved method may be carried into operation.
Figure 2:
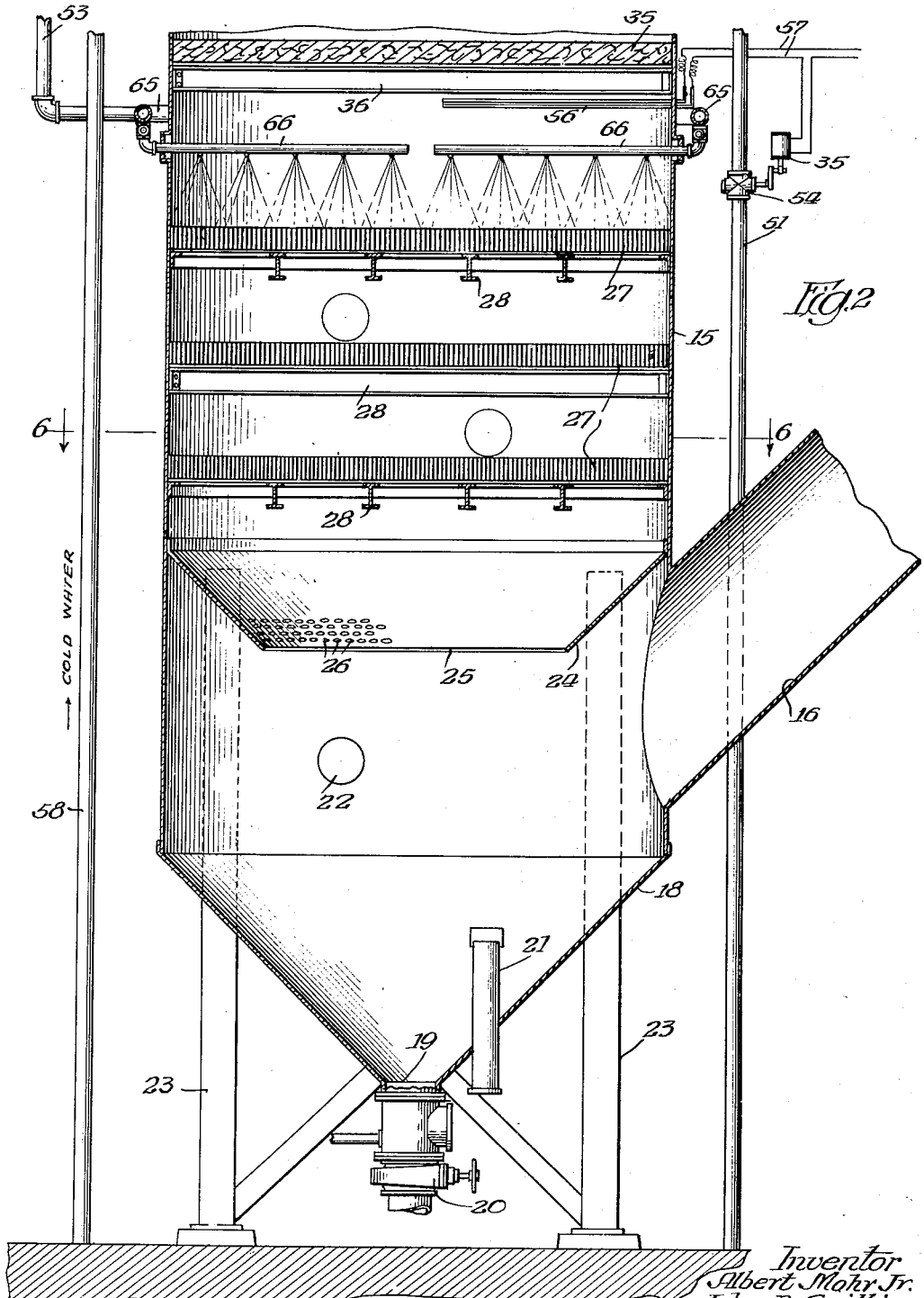
Figure 2 is a view similar to Figure 1 of the lower part of the apparatus.

The apparatus consists essentially of a casing or tower 15 which may be of any desired size and construction and is provided at its lower end with a gas inlet opening 16 and at its upper end with a gas discharge outlet opening 17.

The bottom of the tower is preferably of a conical formation, as at 18, and is provided with a discharge outlet opening 19 controlled by a suitable valve mechanism 20 and, if desired, an emergency overflow outlet 21 may also be provided. A manhole 22 provided with a suitable closure may be arranged in the wall of the tower adjacent its base.

The tower is supported by means of any suitable supports 23 and arranged in the lower portion thereof and preferably above the gas inlet opening 16 is a baffle 24 which is of a conical formation, the bottom 25 thereof being open while the wall or body of the baffle is provided with apertures or openings 26. Arranged within the tower and in spaced relation one above the other are a series of hurdles 27 extending across the tower and supported by means of suitable supports 28. These hurdles are of a construction to provide a very large surface for contact between the hot gases and the hot water. The hurdles may be of any desired or suitable construction but are preferably comprised of a plurality of elements 29 preferably cylindrical in cross-section and provided with openings 30 therethrough. These elements are assembled in contacting relation so as not only to provide openings or passages 30 therethrough but also to provide passages or openings 31 therebetween. This construction and arrangement will provide extended contacting surfaces for the gases and water. Any number of these hurdles may be provided and are preferably arranged in the lower portion of the tower.

Arranged in the upper portion of the tower in spaced relation and above the hurdles 27 are a series of filters 32—33—34—35, any number of which may be provided, and may be of any suitable construction, the same being diagrammatically represented in the drawings. These filters are supported by means of suitable supports 36 and extend preferably across the tower.

Arranged intermediate the filters 33—34 is a water heater 37 supported by suitable supports 38 and intermediate the filters 34—35 is arranged a heater which preferably comprises two sections 39—40 and these sections are held in position by means of suitable supports 41.

A baffle 42 is arranged beneath the filter 33 and above the water heater 37, which is of a conical formation and is provided with an opening 43 disposed above a pan or receptacle 44 mounted upon suitable supports 45. This pan or receptacle 44 receives water from the baffle 42 and the water is conducted by means of a pipe 46 to a pump 47 and which pump forces the water into the heater 37 through a suitable pipe 48. The pump is provided to increase the pressure to compensate for the pressure drop in the coils in the condenser or heater. From this condenser or heater 37 the water is led by means of a pipe 49 to the heater section 39 and is discharged from this section through a pipe 50 and may flow either into the pipe 51 or through a branch 52 into the heater section 40, and from the heater section 40 the water will flow into a pipe 53. The pipe 51 is a discharge pipe to convey away from the apparatus the liquid which flows thereinto from the heater 39 and arranged within the pipe 51 is a valve 54 adapted to be controlled by any suitable electro responsive device 55, the latter serving to open and close the valve. Disposed within the tower and within the hot zone is a thermostat 56 of any suitable construction which controls an electric circuit 57 for causing the electro responsive device 55 to become energized and de-energized according to the temperature in the hot zone in the tower, and through the medium of which thermostat and electric responsive device 55 the valve 54 will be opened or closed, for a purpose to be set forth.

Leading to the tower from any suitable source of supply is a cold water pipe 58 and connected to this pipe are a series of headers 59—60—61—62—63—64—65 which latter preferably encompass the tower and are spaced from each other throughout the length of the tower.

Leading from the header 65 and projecting into the tower, between the uppermost hurdle 27 and the lowermost filter 35 are spray nozzles or pipes 66 for spraying hot water upon the hurdles 27, these nozzles 66 being located in the hot zone of the tower.

During the operation of the apparatus the thermostat 56 will be controlled by the temperature in the hot zone which latter serves to control the valve 54. The valve 54 when closed will cause all of the water from the heater section 39 to flow through the pipe 50, pipe 52, thence through the heater section 40 out through the pipe 53 through the spray nozzle 66. According to the temperature in the hot zone, the valve 54 may be caused to be closed, partially opened, or wide open. The opening of the valve 54 either partially or wholly controls the volume of the heated water which flows through the heater section 40 and thereby controls the temperature of the gas.

If the valve 54 is opened partially or fully, a portion of the hot water from the heater section 39 will flow through the discharge pipe 51 and the remaining portion will flow through the heater section 40, thence to the spray nozzles 66.

When, however, the valve 54 is closed, then all of the water from the section 39 will flow through the section 40 and will thereby modulate or control the temperature of the water discharged from the spray nozzle 66.

With this construction the highest possible washing temperature of the gas is obtained as the gas leaves the hot stage, and results in the greatest amount of water vapor per cubic foot of gas. The condensation of this water vapor will result in the removal of the dirt particles from the gas. When all of the water flows through the heater section 40 from the heater section 39 the maximum temperature of the water to wash the gas is obtained.

As the gas passes in through the inlet 16 it will be contacted by the water or the spray 66, flowing across the baffle surfaces 27 and through the baffle 24. From thence it will flow upwardly through the heaters 40—39—37 and also through the filters 35—34, through the baffle 42, filter 33, filter 32 and out of the discharge outlet 17.

As the hot dirty gasses flow in from the inlet 16 it will be washed by the water flowing through the holes or openings 26 in the baffle 24 and after the gas passes through the baffle 24 it passes upwardly in the tower through a heavy rain falling from the lowermost hurdle 27.

It will then pass through the openings formed in and between the elements 29 of the hurdles causing the gas and the solid particles therein to impinge and flow across the wetted surfaces of the elements 29.

After the gas has passed through the several hurdles 27 it contacts the hot wash sprays from the spray pipe or nozzle 66. The latent and sensible heat of the hot washed gas is then used to preheat the water used in the washing sprays. The cold water flows in through the pipe 58 and is sprayed on to the rising gases through spray nozzles 67 which are connected with the header 60 at the upper end of the tower.

These cold water sprays reduce the temperature of the gas to the incoming water temperature while the gas is passing through the cold washing filter 33.

The water then drops from the filter 33 on to the baffle 42 and will be directed into the pan or receptacle 44 from where it flows through the pipe 46 to the pump 47 which forces the water through the first heater 37, thence through the heater section 39.

The water flowing from the heater section 39 may then be subdivided. This subdivision is controlled by the thermostat 56 which latter controls the electroresponsive device 55 which in turn controls the valve 54 and thereby regulates the amount of water which will pass through the discharge pipe 51.

The volume of water which passes to the hot spray nozzle 66 will pass through the final heater section 40 and thence to the hot water washing spray nozzle 66. The solid particles are removed from the gas as the gas passes through the filter 32.

In order that the filters 32—34—35 may be washed there may be provided spray nozzles or pipes 68—69—70—71—72 that are connected respectively with the headers 59—61—62—63—64, the supply of washed water to these headers being suitably controlled.

It will therefore be manifest that with this invention the highest degree of cleansing is obtained by the use of a heated washing medium in the hot washing stage and that the washing medium itself is heated by the sensible heat and latent heat extracted from the gases leaving the hot stage.

Any form of condenser may be employed but the condensers preferably consist of a series of pipes spaced from each other and connected to inlet and outlet headers. The pipes support fins or partitions which are spaced from each other in directions lengthwise of the pipes.

The spacing of the tubes of each of the heaters are different from each of the tubes of the next adjacent heater and the spacing of the fins on the tubes and between which fins the gas also passes, is different from the spacing of the fins on the tubes of the next adjacent condenser. That is, in the condenser 40 the tubes 73 are spaced from each other for a substantial distance as are also the fins 74 spaced from each other. The tubes 75 of the condenser 39 are spaced from each other for a distance less than the distance which the tube 73 of the condenser 40 are spaced and the fins 76 in the condenser 39 are also spaced from each other for a distance less than the space between the fins 74 on the condenser 40.

Similarly the tubes 77 of the condenser 37 are spaced from each other for a distance less than the space between the tubes 75 of the condenser 39 and the fins 78 on the tube 77 of the condenser 37 are spaced from each other for a distance less than the space between the fins 76 on the tube 75 of the condenser 39.

While the preferred form of the invention has been herein shown and described, it is to be understood that various changes may be made in the details and construction and in the combination and arrangement of the several parts, within the scope of the claim, without departing from the spirit of this invention.

What is claimed as new is:

A gas washing apparatus embodying a hot washing stage and a cold washing stage, a source of supply of washing water, a plurality of heaters between the hot washing and the cold washing stages and through which heaters the water successively flows, said heaters being heated by the gas from the hot stage, a spraying device leading from one of the heaters and delivering the water at the hot washing stage, a discharge outlet leading from the last said heater, a valve device for controlling the course of flow of the water from the last said heater, whereby only a part of the water may be caused to flow through the last said heater to the said spraying device, and a thermostat in the path of flow of the hot gases as they leave the hot washing stage for controlling the actuation of said valve device.

ALBERT MOHR, Jr.
JOHN P. GRILLI.